Aug. 13, 1935.　　　N. W. FIELDS　　　2,011,240
DEMURRAGE CALCULATOR
Original Filed Oct. 9, 1929　2 Sheets-Sheet 2
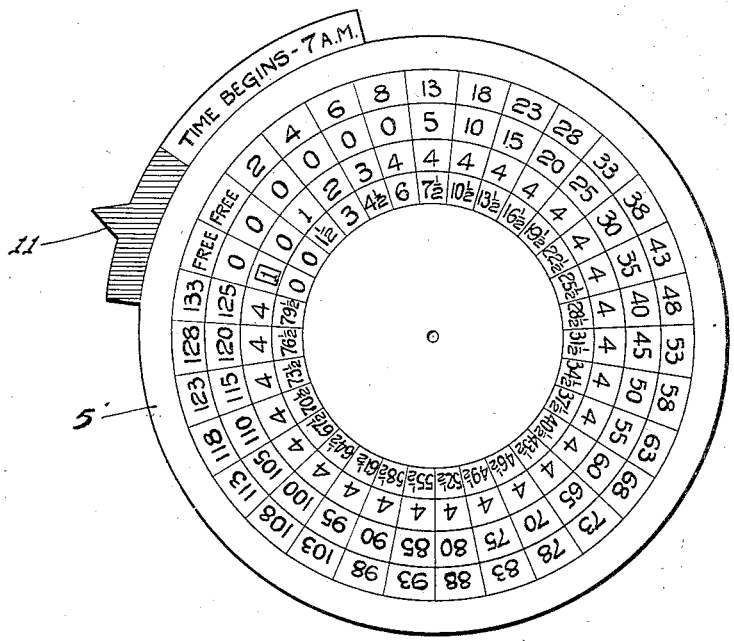
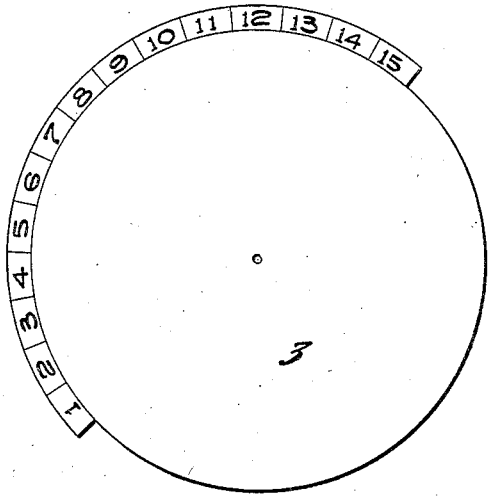
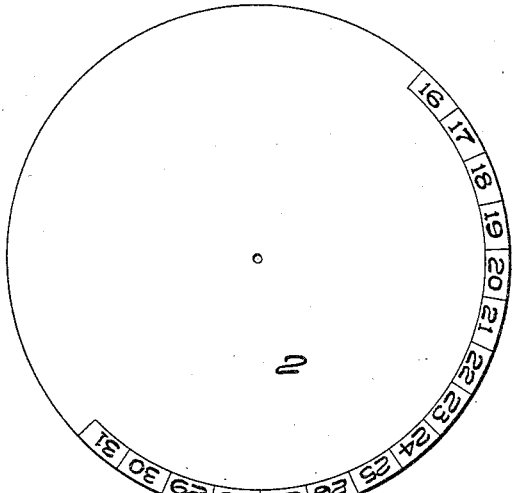
Norman W. Fields
INVENTOR
BY
Towson Price
ATTORNEY Patented Aug. 13, 1935

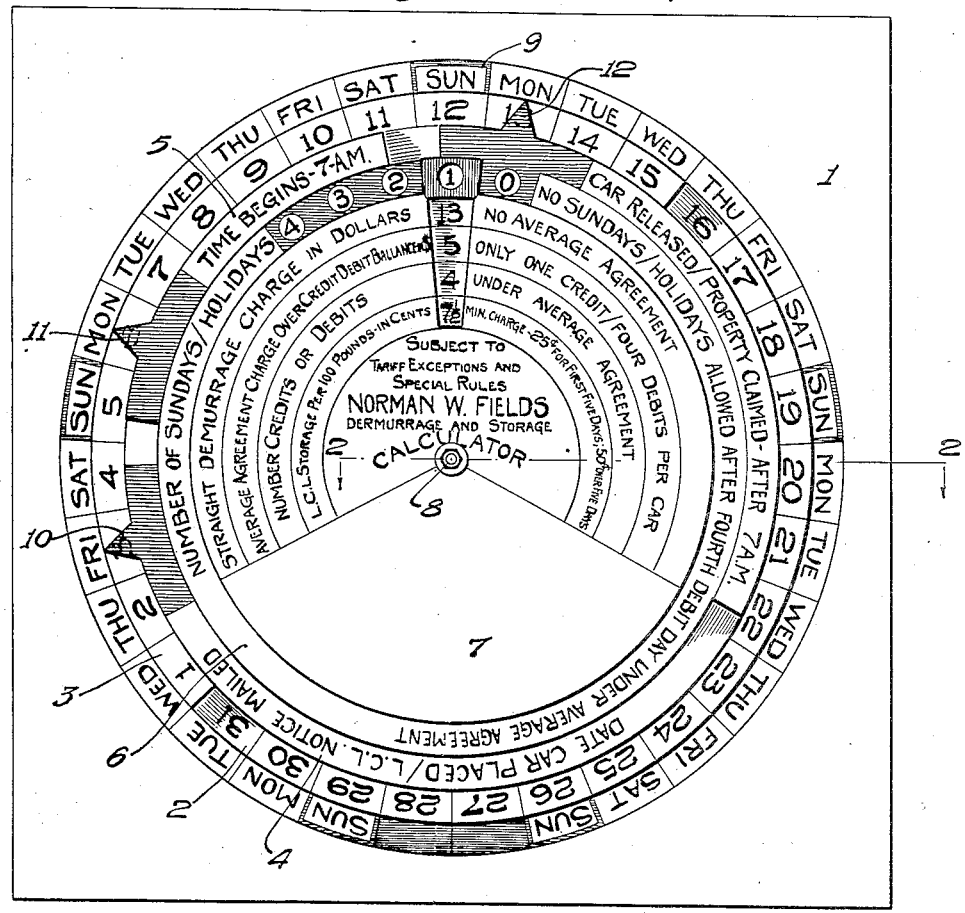

2,011,240

UNITED STATES PATENT OFFICE 2,011,240

DEMURRAGE CALCULATOR

Norman W. Fields, Washington, D. C.

Application October 9, 1929, Serial No. 398,364
Renewed January 4, 1934

8 Claims. (Cl. 235—88)

This invention relates to devices adapted to calculate demurrage and/or storage charges on less than carload lots of freight.

The principal object of my invention, generally considered, is to provide a device for readily calculating demurrage and/or storage charges on freight and deducting or allowing for Sundays and/or holidays which may affect the calculation.

Another object of my invention is to provide a demurrage calculator involving relatively movable disks or dials so movable or adjustable with respect to one another that demurrage or storage calculations may be made quickly and conveniently for a period of time with allowance being made for Sundays and/or holidays occurring during said time.

A further object of my invention is to provide a demurrage calculator comprising disks or dials representing a calendar and means for adjusting them so that any month of any year may be represented.

A still further object of my invention is to provide a demurrage and storage calculator adapted to calculate simultaneously straight and average agreement demurrage as well as L. C. L. (less than car load) storage charges while conveniently allowing for or deducting Sundays and/or holidays affecting the calculations.

Other objects and advantages of the invention relating to the particular arrangement and construction of the various parts will become apparent as the description proceeds.

Referring to the drawings illustrating my invention, the scope whereof is defined by the appended claims.

Figure 1 is a plan view of the calculator with all of the parts thereof in assembled relation.

Figure 2 is a fragmentary transverse sectional view on the line 2—2 of Figure 1, looking in the direction of the arrows.

Figure 3 is a plan view on a reduced scale of one of the disks or dials having figures thereon corresponding with days of the month.

Figure 4 is a plan view on a scale corresponding with that of Figure 3 of the other disk or dial with figures thereon representing days of the month, the days or figures of Figure 4 being supplemental to that of Figure 3 so that a complete month of a given number of days may be represented.

Figure 5 is a plan of the disk or dial with the indicator or pointer representing the date on which the time begins or is reckoned from and containing thereon a table corresponding to demurrage and/or storage charges for different periods of time.

Figure 6 is a fragmentary view of the disk or dial with a pointer or indicator adapted to register with the day on which the car is released or the property claimed and containing figures corresponding with the number of Sundays and/or holidays occurring between the day the time begins and the day it ends, whereby the charge may be adjusted in accordance therewith.

Figure 7 is a fragmentary view of the disk or dial which is, in the embodiment disclosed, used in combination with the disk or dial of Figure 6 to make an adjustment for the number of Sundays and/or holidays in the time under consideration, said disk or dial containing a window or opening to register with the number corresponding with the Sundays and/or holidays shown on the dial of Figure 6 and another window to uncover the figures which give the charges desired.

In calculating and charging demurrage there are two cases to be taken into consideration, one is called "straight demurrage" and the other "average agreement demurrage". On straight demurrage there are two days of free time after which a charge of two dollars per day is made for the next four days and following this there is a charge of five dollars per day until the car is unloaded. On straight demurrage Sundays and holidays are not figured. The storage charge per hundred pounds for less than carload lots (L. C. L.) is figured in a corresponding manner, that is, after the two free days there is a charge of one and a half cents per day per hundred pounds for the next five days, after which three cents a day per hundred pounds is charged. The average agreement demurrage for corporations or other large concerns is a special adjustment of demurrage charges which allows credit for cars unloaded before the end of the free period and provides debits for those unloaded after the end of the free period with provision for balancing debits and credits and charging five dollars per day after the fourth debit day. The details of calculating these various charges will become more clear from the following description.

Referring to the drawings in detail, like parts being designated by like reference characters, I have shown one embodiment of my demurrage and storage calculator involving a base or relatively large plate or dial 1 which is desirably either circular or square. If constructed as indicated the corner spaces are available for advertising purposes. Movably associated with the plate 1 are desirably six disks or dials numbered, respectively, 2, 3, 4, 5, 6, and 7. All of the disks or dials 1 to 7 inclusive are desirably movably connected by having a bolt or pivot pin 8 passing through the center thereof so that relative rotative adjustment of the dials is permitted.

The base 1 has marked thereon the names of the days of the week arranged sequentially as a series of weeks disposed about a circumference around the periphery of the dials or disks 2 and 3 as shown particularly in Figure 1. The names of the Sundays, as represented at 9, are preferably marked so as to be readily distinguishable from the names of the other days of the week to facilitate deductions and allowances for such Sundays.

The disk 2 preferably has disposed around approximately half of its circumference, numbers from 16 to 31 inclusive and the disk 3 preferably has the numbers from 1 to 15 inclusive around the portion of its circumference complementary to the circumferential portion of the disk 2 so that when the disk 3 is superimposed upon the disk 2, the numbers from 1 to 15 may be arranged to cover up the blank circumferential portion of the disk 2 and give, in effect, a disk in which the circumference is equally divided into 31 parts and each part designated by a number from 1 to 31 inclusive. In this way the disks 2 and 3 may be adjusted one with respect to the other so that the numbers 31; 30 and 31 or 29, 30 and 31 may be covered up to respectively represent months of 30, 29 or 28 days, while when no numbers are covered up, months of 31 days are represented.

Superimposed upon the disk 3 is a disk 4 which has an indicator or pointer 10 adapted to be brought into registry with the day of the week and month on which a car is placed and/or L. C. L. notice mailed after the base and the disks 2 and 3 have been brought into proper registry one with another to designate a given month. The disk 4, in addition to having the pointer or indicator 10, bears the notation "Date car placed/ L. C. L. notice mailed", but may be otherwise blank.

Disposed upon the disk 4 is a disk 5, shown in detail in Figure 5, which has indicating means, such as a pointer 11, adapted to be brought into registry with the day the time begins and said disk 5, in addition to bearing the notation "Time begins—7 A. M." has thereon a circumferentially arranged table of figures and letters corresponding with the demurrage and storage charges for various periods of time, the surface of the disk 5 being divided by radii corresponding with the days of the week and days of the month divisions on the associated plate 1 and disks 2 and 3, so that there are 31 radial columns arranged circumferentially about the center of the disk 5, each column containing figures or indicating means corresponding with the charges, credits or debits in accordance with given periods of time depending on the angular position of the columns with respect to the pointer or indicator 11.

Disposed upon the disk or dial 5 is a disk or dial 6 which has a pointer or indicator 12 adapted to be brought into registry with the day corresponding with the day on which the car was released and/or property claimed. In addition to containing the notation "Car released/property claimed—after 7 A. M.", it has means thereon for making an adjustment for Sundays and/or holidays and therefore bears the notation "Number of Sundays/holidays" followed by the numerals 4, 3, 2, 1 and 0 arranged circumferentially and angularly spaced to correspond with the angular spacing of the days of the month on the associated dials. Following the numbers 4, 3, 2, 1 and 0 appears the legend, "No Sundays/holidays allowed after fourth debit day under average agreement". A window 13 is provided so as to disclose the characters on the dial 5 corresponding with the period of time represented by the relation between the pointers 11 and 12 for 4, 3, 2, 1 and 0 intervening Sundays and/or holidays.

Disposed upon the dial 6 is a disk 7 which, in the embodiment disclosed, is used for covering up all but one of the five columns of figures exposed by the dial 6, so that only the figures that should be read in accordance with a given example are seen. For that purpose it preferably has a tab 14 with an opening 15, which when the calculator is used, is brought into registry with one of the figures 4, 3, 2, 1 and 0 on the dial 6 and a corresponding approximately sector shaped opening 16 through which appears the column of figures which should be read to determine the answer to the problem of what the demurrage or storage charge is. The dial 7 preferably bears notations corresponding with the charges shown, for example, the outer notation is "Straight demurrage charge in dollars no average agreement" corresponding with the top or outer figure appearing in the window 16. The next circumferential notation is "Average agreement charge over credit debit balance in $ only one credit/four debits per car" corresponding with the second figure in the window 16. The next circumferential designation is "Number credits or debits under average agreement" corresponding with the third figure appearing in the window 16. The next designation is "L. C. L. storage per 100 pounds—in cents. Min. charge—25¢ for first five days, 50¢ over five days." The remaining portion of the disk 7 may carry the title and any note that the operator should bear in mind, and may also carry advertising matter (not shown). If it is desired to omit the disk 7, the notations appearing thereon would, of course, be transferred to the corresponding portions of the disk 6.

The dials in Figure 1 are set in order to illustrate the following example of how to operate or use the demurrage and storage calculator heretofore described. The dials 2 and 3 are first adjusted so that the numbers 1 to 31, which indicate the days of the month, fall opposite or register with the names of the days of the week on the dial 1 for the period of time for which demurrage is to be calculated. If the demurrage or storage to be calculated runs from one month to the other and the first month has only 28, 29 or 30 days, see that the days of the month are in proper sequence by covering the unused days of the first month by the portion of the dial 3 which starts with the figure 1. This will leave a space between figures 15 and 16 which must be closed, without changing the setting of the pointers 10 and 11 with respect to plate 1, if the car is released or the goods claimed after the fifteenth of the month, in order to show the right answer without a supplemental calculation.

The pointer or indicator 10 on the disk 4 marked "Date car placed/L. C. L. notice mailed" may be set on the proper date of the month. The pointer 11 on the disk 5 marked "Time begins—7 A. M." is set on the following day unless such day falls on a Sunday or holiday and if so on the first day following such Sunday or holiday as may consecutively follow the date on which the car is placed or the L. C. L. notice is mailed. In the example represented, the car is assumed to have been placed on Friday, July 3, so that the pointer 10 registers with Friday, 3rd, the 4th being a holiday, the pointer 11 is made to register with Monday the 6th when the time begins. In an embodiment of the invention omitting the disk 4, the pointer 11 on the disk 5 could be initially set on the date the time begins.

The pointer 12 of the disk 6 is then set on the date the car is released or the property claimed provided that if such occurs prior to 7 A. M. the day previous shall be used. The top disk 7 may then be moved so that the figure showing in the circular opening 15 will indicate the number of Sundays and/or holidays occurring between the dates on which time begins and ends. The amount of straight demurrage may then be read at the top of the column of figures showing through the window 16 of the top disk 7, or if the disk 7 is removed or omitted, the amount may then be read at the top of the column of figures under or radial of the numeral on the disk 6 corresponding with the number of Sundays and/or holidays occurring between the dates on which the time begins and ends, which amount is in dollars, and if the car is released on Monday, July 13, as in the example represented, the amount is thirteen dollars as shown in Figure 1, because there is one Sunday, July 12 between July 6 and 13. The amount of storage charges in cents per 100 pounds is read at the bottom of the column of figures and in the example given is seven and one half cents. In the cases like the foregoing, as will be noted it is only necessary to adjust and use one of the disks 2 and 3, in this instance the latter.

To figure demurrage charges under an average agreement, the dials 1, 2, 3, 4, 5 and 6 are arranged as in the previous example. The top dial 7, if used, is moved so that the figures showing in the circular opening 15 indicate only the number of Sundays and/or holidays that occur during the establishment of the first four debit days. So in the example under consideration, if the time starts Monday, July 6 and ends Monday, July 13, no Sundays or holidays are allowed as the fourth debit day is reached on Saturday, July 11, during which time no Sundays or holidays are found. The dial 7 should therefore be turned so that the number zero is read through the circular opening 15 and the amount in dollars to be charged over any credit-debit balance that may be established under the average agreement is read in the next to the top figure showing through the window, or disposed under or radial of the numeral zero on the disk 6, which, by referring to Figures 1 and 5, will be found to be ten dollars as this number appears to the right of 5 which is directly under the top figure 13 read in connection with the example as the straight demurrage charge in dollars. The number of debit-credit days allowed in establishing the debit-credit balance for the month is the third figure in the column. It should be noted that if the car is released on the same day that the time begins one credit is allowed. If released on the second free day, no credit or debit is allowed, while one debit is allowed or charged for each of the next four days, after which five dollars per day is charged against the car, such amount to be added to any debit-credit balance that may be charged against the firm at the end of the month. If the number of credits exceeds the number of debits, no debit/credit balance exists. If the number of debits exceeds the number of credits, two dollars is charged for each debit.

In the example under consideration the time starts Monday, July 6 and ends Monday, July 13. No Sundays or holidays are allowed as indicated under the average agreement. In the window of the top dial it is indicated that ten dollars is to be charged against the car in addition to any amount that may be charged on account of the debit/credit balance existing at the end of the month. If during the month, for example, three other cars had been received and each of them released during the first free day, three credits would have been earned. The first car, however, has four debits, which leaves one debit charged against the firm at the end of the month or two dollars. In settling the demurrage account, the firm would be obligated to pay the carrier this two dollar item plus the ten dollars indicated through the window 16 or a total of twelve dollars.

From the foregoing disclosure, it will be seen that I have devised a demurrage and storage calculator which may be conveniently used for the purpose and which is adjustable for use over any period of time, that is, during any month of any year. Of course, the calculator is not big enough to show amounts for periods of more than the one month in length, but such demurrage periods would be very unusual and could be calculated by adding to that shown by the calculator an amount corresponding to the number of days charged in excess of the maximum shown by the calculator times five dollars, it being seen from Figure 5 that the demurrage increases at the rate of five dollars for every additional day other than Sundays and holidays for which the car is held after the first four debit days. In the same way it is seen that the L. C. L. storage charge per 100 pounds increases after the maximum amount shown in Figure 5 at the rate of three cents per day. Although a specific embodiment has been illustrated, it will be obvious that I do not wish to be limited to the details, as modifications may be made within the spirit and scope of my invention as defined by the appended claims. Thus it will be seen that although in the embodiment disclosed I use seven disks or elements, six of which are circular plates and one a square plate, connected for relative rotation by a central pivot pin, it will be understood that I am not limited to this number of plates, nor am I limited to the specific mode of movably connecting the plates.

Having now described my invention, I claim:

1. A device for calculating demurrage and/or storage charges comprising a plate and a plurality of associated members pivotally mounted with respect thereto, said plate having the days of the week arranged sequentially thereon, the members comprising disk means with days of the month arranged sequentially thereon and movable with respect to the plate so that the corresponding days register with one another, a disk with indicating means and figures thereon representing charges for different periods of time, said disk being movable with respect to the plate and disk means so that the indicating means of said disk registers with the day from which time is figured, and other disk means with indicating means thereon movable with respect to the plate, first disk means and disk so that said last indicating means registers with the day the time ends, said other disk means having a window opening over the figures on the disk which represent the charges for the elapsed time under consideration.

2. A device for calculating demurrage and/or storage charges comprising a plate with days of the week arranged in series thereon, a plurality of disks with days of the month arranged in series thereon and movable with respect to each other and with respect to the plate so that the days of the month register with corresponding days of the week according to the time under consideration, another disk with figures representing charges for different periods of time and indicating means thereon, said disk being movable with respect to the other disks so that the indicating means of said disk registers with the day from which time is figured, and disk means with indicating means thereon movable so that said last indicating means registers with the day the time ends, said disk means having a window opening over the figures which represent the charges for the elapsed time under consideration.

3. A device for calculating demurrage and/or storage charges comprising a plate and a plurality of disks pivotally mounted thereon, said plate having the days of the week circumferentially arranged adjacent the edge portion of the first or adjacent disk, the adjacent disk having days of the month arranged sequentially adjacent the periphery thereof and adapted to register with corresponding days of the week on the plate in accordance with a given month under consideration, another of said disks having indicating means and figures representing charges for different periods of time arranged circumferentially thereon and movable so that the indicating means registers with the day of the week and month from which time is figured, and still another of said disks having an indicator and movable so that said indicator registers with the day the time ends, said last-mentioned disk being provided with a window showing figures on the second-mentioned disk representing the charges for the time under consideration.

4. A device for calculating demurrage and/or storage charges comprising a plate with a plurality of generally circular disks pivotally mounted thereon, said plate having the days of the week arranged circumferentially around the periphery of the nearest disk, the disk nearest to the plate having numerals applied around the edge portion thereof representing the days of the month, adapted to register with corresponding week days and movable with respect to the plate so that said days of the month may correspond with days of the week for a given month under consideration, a second of said disks with a pointer and figures representing charges for different periods of time arranged circumferentially thereon, said second disk being movable so that the pointer registers with the day the demurrage time begins, and another of said disks with a pointer movable so that it registers with the day the demurrage time ends, said last-mentioned disk having a window showing the figures on the second disk which represents the charges for the elapsed time under consideration.

5. A device for calculating demurrage and/or storage charges comprising a plate with a plurality of generally circular disks pivotally mounted thereon, said plate and the adjacent disk forming an adjustable calendar adapted to represent any month or portion thereof, a second of said disks with a pointer and figures representing charges for different periods of time arranged in series thereon and spaced circumferentially so as to correspond with the spacing of days on the calendar, said second disk being movable so that the pointer registers with the day the demurrage time begins, and another of said disks with a pointer movable so that it registers with the day the demurrage time ends, said last-mentioned disk having a window showing the figures on the second disk which represent the charges for the elapsed time under consideration.

6. A device for calculating demurrage and/or storage charges comprising a plate with a plurality of generally circular disks pivotally mounted thereon, said plate having the days of the week arranged circumferentially around the periphery of the nearest disk, said disk nearest to the plate and the disk immediately adjacent thereto having applied around the edge portions thereof numerals representing the days of the month adapted to register with the corresponding week days and movable with respect to the plate so that said days of the month may correspond with the days of the week for a given month under consideration, the days on one disk being supplementary to those on the other so that when used together they may be arranged with respect to one another to show all the days of a given month, a third of said disks with a pointer and figures representing charges for different periods of time arranged circumferentially thereon, said third disk being movable so that the pointer registers with the day the demurrage time begins, and a fourth of said disks with a pointer movable so that it registers with the day the demurrage time ends, said disk having a window showing the figures on the third disk which represent the charges for the elapsed time under consideration.

7. A device for calculating demurrage and/or storage charges comprising a plate with a plurality of generally circular disks pivotally mounted thereon, said plate having the days of the week arranged circumferentially around the periphery of the nearest disk, the nearest disk having applied around the edge portion thereof numerals representing the days of the month adapted to register with corresponding week days and movable with respect to the plate so that said days of the month may correspond with the days of the week for a given month under consideration and form, in effect, a calendar, a second of said disks with a pointer adapted to be moved so that said pointer registers with the day of the month at which a car is placed and/or L. C. L. notice mailed, a third of said disks with a pointer and figures representing charges for different periods of time arranged circumferentially thereon, said third disk being movable so that the pointer registers with the day the demurrage time begins, and a fourth of said disks with a pointer movable so that it registers with the day the demurrage time ends, said fourth disk having a window showing the figures on the third disk which represent the charges for the elapsed time under consideration.

8. A device for calculating demurrage and/or storage charges comprising a plate with a plurality of generally circular disks pivotally mounted thereon, said plate having the days of the week arranged circumferentially around the periphery of the nearest disk, the disk adjacent said plate having numerals applied around the edge portions, said numerals representing the days of the month and being adapted to register with corresponding week days and movable with respect to the plate so that said days of the month may correspond with days of the week for a given period of time under consideration, a second of said disks with a pointer and figures representing demurrage charges for different periods of time arranged circumferentially thereon, said second disk being movable so that the pointer registers with the day the demurrage time begins, a third of said disks with a pointer movable so that it registers with the day the demurrage time ends, said third disk having a window showing the figures on the second disk which represent the charges for the elapsed time under consideration, said third disk also having figures adjacent the periphery representing the number of Sundays and/or holidays in the elapsed time in order to indicate which of the radial columns of figures showing through the window are to be read, and the final one of said disks with a smaller window therein and movable so as to cover up all the figures except those in the column to be read for the elapsed time under consideration.

NORMAN W. FIELDS.